US012179923B2

(12) United States Patent
Bathla et al.

(10) Patent No.: US 12,179,923 B2
(45) Date of Patent: Dec. 31, 2024

(54) AIRCRAFT SMART CABIN CONTROL

(71) Applicant: Goodrich Corporation, Charlotte, ND (US)

(72) Inventors: Dharamveer Surya Prakash Bathla, Sonipat (IN); Ambreesh Chandra Ramesh, Tamil Nadu (IN); Achala Dambe, Karnataka (IN); Gaurav Sahay, Bangalore (IN); Rajesh Vasudevan Nair, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 587 days.

(21) Appl. No.: 17/351,528

(22) Filed: Jun. 18, 2021

(65) Prior Publication Data

US 2022/0001985 A1 Jan. 6, 2022

(30) Foreign Application Priority Data

Jun. 25, 2020 (IN) .............................. 202041027013
Jun. 26, 2020 (IN) .............................. 202041027227

(51) Int. Cl.
| | | |
|---|---|---|
| *G06F 21/35* | (2013.01) | |
| *B64D 11/00* | (2006.01) | |
| *G05B 19/02* | (2006.01) | |
| *G06F 3/01* | (2006.01) | |
| *G06K 7/00* | (2006.01) | |
| *G06K 7/14* | (2006.01) | |

(52) U.S. Cl.
CPC ........ *B64D 11/0015* (2013.01); *B64D 11/003* (2013.01); *G05B 19/02* (2013.01); *G06F 3/017* (2013.01); *G06F 21/35* (2013.01); *G06K 7/00* (2013.01); *G06K 7/1417* (2013.01)

(58) Field of Classification Search
CPC .............. B64D 11/0015; B64D 11/003; B64D 11/00151; B64D 11/00155; G05B 19/02; G06F 3/017; G06F 21/35; G06F 21/36; G06K 7/00; G06K 7/1417
See application file for complete search history.

(56) References Cited

U.S. PATENT DOCUMENTS

| | | | |
|---|---|---|---|
| 9,143,732 B2 | 9/2015 | Keen et al. | |
| 9,849,988 B2 | 12/2017 | Carles et al. | |
| 9,965,931 B2 | 5/2018 | Reinbold et al. | |
| 10,204,367 B1 * | 2/2019 | Alkasimi | G06Q 20/22 |

(Continued)

FOREIGN PATENT DOCUMENTS

WO 2020032790 A1 2/2020

*Primary Examiner* — Kenneth M Lo
*Assistant Examiner* — Mohammed Shafayet
(74) *Attorney, Agent, or Firm* — Suiter Swantz IP

(57) ABSTRACT

A touchless system for an aircraft cabin is disclosed. The system includes machine-readable codes placed on passenger seats and other aircraft surfaces that may be scanned and linked to cabin control systems through an application installed on personal portable electronic devices. The system also includes a communication system linked to the personal portable electronic devices via the application and linked to the cabin control systems that facilitates the control of one or more control systems by the personal portable electronic device. One of the cabin control systems is configured as an overhead storage container configured with a gesture sensing system, allowing the storage lid to be opened through specific gestures.

12 Claims, 10 Drawing Sheets

(56) References Cited

U.S. PATENT DOCUMENTS

| | | | |
|---|---|---|---|
| 10,597,158 B2 | 3/2020 | Shah et al. | |
| 10,780,980 B2 | 9/2020 | Riedel et al. | |
| 10,829,220 B2 | 11/2020 | Sidambarom et al. | |
| 10,906,458 B2 | 2/2021 | Simms et al. | |
| 2007/0241927 A1* | 10/2007 | Ratnakar | G06Q 10/025 244/118.6 |
| 2011/0314489 A1* | 12/2011 | Keen | H04N 21/4126 725/23 |
| 2012/0298737 A1* | 11/2012 | Thakar | B64D 11/0015 235/375 |
| 2015/0057796 A1 | 2/2015 | Boodaghians | |
| 2015/0083858 A1 | 3/2015 | Jindel | |
| 2016/0059954 A1* | 3/2016 | Fagan | B64D 11/00153 701/3 |
| 2018/0075717 A1* | 3/2018 | Reinbold | H04N 21/41265 |
| 2018/0170550 A1* | 6/2018 | Streckert | B64D 11/0639 |
| 2018/0257554 A1* | 9/2018 | Simms | B60Q 3/30 |
| 2019/0356741 A1* | 11/2019 | Watson | B60N 2/56 |
| 2020/0339266 A1* | 10/2020 | McMillan | H04W 4/80 |
| 2020/0342040 A1* | 10/2020 | Adams | G06Q 20/12 |

* cited by examiner

AIRCRAFT SMART CABIN CONTROL

PRIORITY

The present application claims the benefit under 35 U.S.C. § 119(e) of Indian Provisional App. No. 202041027013 (filed Jun. 25, 2020), entitled "AIRPLANE SMART CABIN CONTROL", which is incorporated herein by reference in its entirety, and Indian Provisional App. No 202041027227 (filed Jun. 26, 2020), entitled "CONTACT MINIMIZING METHOD FOR OVERHEAD BIN OPERATION", which is incorporated herein by reference in its entirety.

BACKGROUND

Recent pandemics have increased interest in hygiene practices, particularly for people who travel. Commercial airlines are particularly concerned with hygiene and cleanliness, as people sickened with transmissible diseases can spread disease across large distances in a relatively short amount of time. The closed environment of the aircraft cabin is of particular concern, as surfaces touched by a contagious passenger may easily be touched by another passenger, spreading disease. Methods to reduce contamination of surfaces by application of disinfecting materials (e.g., soap, detergent, or bleach) are only effective until touched by another contagious passenger. These disinfecting materials may also adversely alter the color or condition of the surfaces being cleaned. Accordingly, it is desirable to provide a system or method for creating a contagion free environment that is less destructive to aircraft surfaces than conventional approaches.

SUMMARY

A system is disclosed. In one or more embodiments, the system includes a first machine-readable code disposed on a first surface of an aircraft cabin, wherein the first machine-readable code is scanned by a portable electronic device, generating first scanned data. In one or more embodiments, the system further includes a communication unit in communication with the portable electronic device. In one or more embodiments, the communication unit includes a receiver. In one or more embodiments, the communication unit further includes a transmitter. In one or more embodiments, the communication unit further includes at least one processor. In one or more embodiments, the communication unit further includes a memory coupled to the at least one processor. In one or more embodiments, the memory includes instructions stored upon that, when executed by the at least one processor, causes the at least one processor to receive the first scanned data from the portable electronic device. In one or more embodiments, the memory includes instructions stored upon that, when executed by the at least one processor, causes the at least one processor to receive an identification input from the portable electronic device. In one or more embodiments, the memory includes instructions stored upon that, when executed by the at least one processor, causes the at least one processor to determine, based on the first scan data and the identification input, a user identification. In one or more embodiments, the memory includes instructions stored upon that, when executed by the at least one processor, causes the at least one processor to receive a first input message from the portable electronic device. In one or more embodiments, the memory includes instructions stored upon that, when executed by the at least one processor, causes the at least one processor to send a control message to one or more control systems based on the user identification and the first input message. In one or more embodiments, the system further includes an application installed on the portable electronic device. In one or more embodiments, the application is configured with commands for implementing the steps of receiving the first scanned data. In one or more embodiments, the application is configured with commands for implementing the steps of receiving the identification input. In one or more embodiments, the application is configured with commands for implementing the steps of sending the first scanned data and the identification input to the communication unit. In one or more embodiments, the application is configured with commands for implementing the steps of sending the first input message to at least one of the communication unit or the one or more control systems.

In some embodiments of the system, one of the one or more control systems is configured as a passenger service unit comprising at least one of a light, a gasper, or an attendant signal, wherein the first input message is configured as an instruction to the passenger service unit to adjust at least one of a light brightness, a gasper airflow intensity, a gasper airflow direction, or an attendant signal status.

In some embodiments of the system, one of the one or more control systems is configured as an entertainment system, wherein the first input message is configured as an instruction the entertainment system to send media to the portable electronic device.

In some embodiments of the system, the entertainment further comprises a display, wherein the first input message instructs the entertainment system is configured as an instruction to the entertainment system, wherein the instruction includes displaying media on the display. In some embodiments, the instruction to the entertainment system includes casting media from the display to the portable electronic device. In some embodiments, the instruction to the entertainment system includes casting media to the display from the portable electronic device.

In some embodiments of the system, one of the one or more control systems is configured as a seat control unit comprising at least one of a recline element, a swivel element, or a lock element, wherein the first input message is configured as an instruction to the seat control unit to adjust at least one of the recline element, the swivel element, or the lock element.

In some embodiments, of the system, one or more control systems is configured as a provisioning system, wherein the first input message is configured an instruction to the provisioning system to order a provision vended by the provisioning system or make a payment.

In some embodiments of the system, the system includes an overhead storage compartment. In some embodiments, the overhead storage compartment includes a storage body. In some embodiments, the overhead storage compartment further includes a storage lid, wherein the first input message is configured as an instruction to the overhead storage compartment to at least one of open the storage lid or close the storage lid.

In some embodiments of the disclosure, the overhead storage compartment further includes a linear actuator configure to open and close the storage lid. In some embodiments of the disclosure, the overhead compartment further includes an automated latch configured to lock and unlock the storage lid. In some embodiments, the overhead storage compartment is configured to include a digital controller communicatively coupled to the linear actuator and the automated latch. In some embodiments, the digital controller is configured to control at least one of the linear actuator or the automated latch upon receiving at least one of a control message from the communication unit, the first input message from the portable electronic device, or a gesture signal from a gesture sensing system. In some embodiments, the overhead storage compartment further includes a gesture sensing system configured to generate the gesture signal. In some embodiments, the gesture sensing system includes a gesture sensor configured to detect a gesture instruction. In some embodiments, the gesture sensing system further includes a signal conditioning unit. In some embodiments, the gesture sensing unit further includes an analog to digital converter.

In some embodiments of the system, one or more control systems is configured as a lavatory system, wherein the first input message is configured as an instruction to at least one of open, close, lock, or unlock a lavatory door. In some embodiments, the first input message is configured as an instruction to open or close a commode lid. In some embodiments, the first input message is configured as an instruction to activate a disinfection unit. In some embodiments, the first input message is configured as an instruction to activate a call button. In some embodiments, the first input message is configured as an instruction to activate a lavatory status indicator.

In some embodiments of the system, the system further includes a second machine-readable code disposed on a second surface of the aircraft cabin, wherein the second machine-readable code is scanned by the portable electronic device, generating second scanned data. In some embodiments, the at least one processor is further instructed to receive the second scanned data from the portable electronic device. In some embodiments, the at least one processor is further instructed receive a second input message from the portable electronic device. In some embodiments, the at least one processor is further instructed to send a sub-control message to one or more sub-control systems based on the user identification and the second input message.

In some embodiments of the system, one of the one or more sub-control systems is configured as an overhead storage compartment comprising a storage lid, wherein the second input message is configured as an instruction to the overhead storage compartment to at least one of open the storage lid of or close the storage lid.

In some embodiments of the system, one of the one or more sub-control systems is configured as a provisioning system, wherein the second input message is configured an instruction to the provisioning system to at least one of order a provision vended by the provisioning system or make a payment.

In some embodiments of the system, the one or more sub-control systems is configured as a lavatory system, wherein the first input message is configured as an instruction to at least one of: open, close, lock, or unlock a lavatory door; open or close a commode lid; activate a disinfection unit; activate a call button; or activate a lavatory status indicator.

Another system is also disclosed. In one or more embodiments, the system includes a storage body. In one or more embodiments, the system further includes a storage lid. In one or more embodiments, the system further includes a linear actuator mechanically coupled to the storage body and the storage lid, configured to open and close the storage lid. I one or more embodiments, the system further includes an automated latch configured to lock and unlock the storage lid. In some embodiments, the system further includes a digital controller communicatively coupled to the linear actuator and the automated latch. In one or more embodiments, the digital controller is configured to control at least one of the linear actuator or the automated latch upon receiving at least one of a gesture signal from a gesture sensing system, a control message from a communication unit, a first input message from a portable electronic device, or a second input message from the portable electronic device. In one or more embodiments, the system further includes the gesture sensing system configured to generate the gesture signal. In one or more embodiments, the gesture sensing system includes a gesture sensor configured to detect a gesture instruction. On one or more embodiments, the gesture sensing system further includes a signal conditioning unit. In one or more embodiments, the gesture sensing unit further includes an analog to digital converter.

In some embodiments of the system, the system further includes a first machine-readable code disposed on a first surface of an aircraft cabin, wherein the first machine-readable code is scanned by a portable electronic device, generating first scanned data. In some embodiments of the system, the system further includes a communication unit communicatively coupled to the portable electronic device. In some embodiments, the communication unit includes a transceiver, a transmitter, at least one processor, and a memory coupled to the at least one processor. In some embodiments, the memory includes instructions stored upon that, when executed by the at least one processor, cause the at least one processor to receive the first scanned data from the portable electronic device. In some embodiments, the at least one processor is further instructed to receive the first scanned data from the portable electronic device. In some embodiments, the at least one processor is further instructed to determine, based on the first scan data and the credential input, a user identification. In some embodiments, the at least one processor is further instructed to receive the first input message from the portable electronic device. In some embodiments, the at least one processor is further instructed to send the control message to one or more control systems based on the user identification and the first input message. In some embodiments, the system further includes an application installed on the portable electronic device.

In some embodiments, the application is configured to implement a step of receiving the first scanned data. In some embodiments, the application is further configured to implement a step of receiving an identification input. In some embodiments, the application is further configured to implement a step of sending the first scanned data and the identification input to the communication unit. In some embodiments, the application is further configured to implement a step of sending the first input message to at least one of the communication unit or the one or more control systems.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
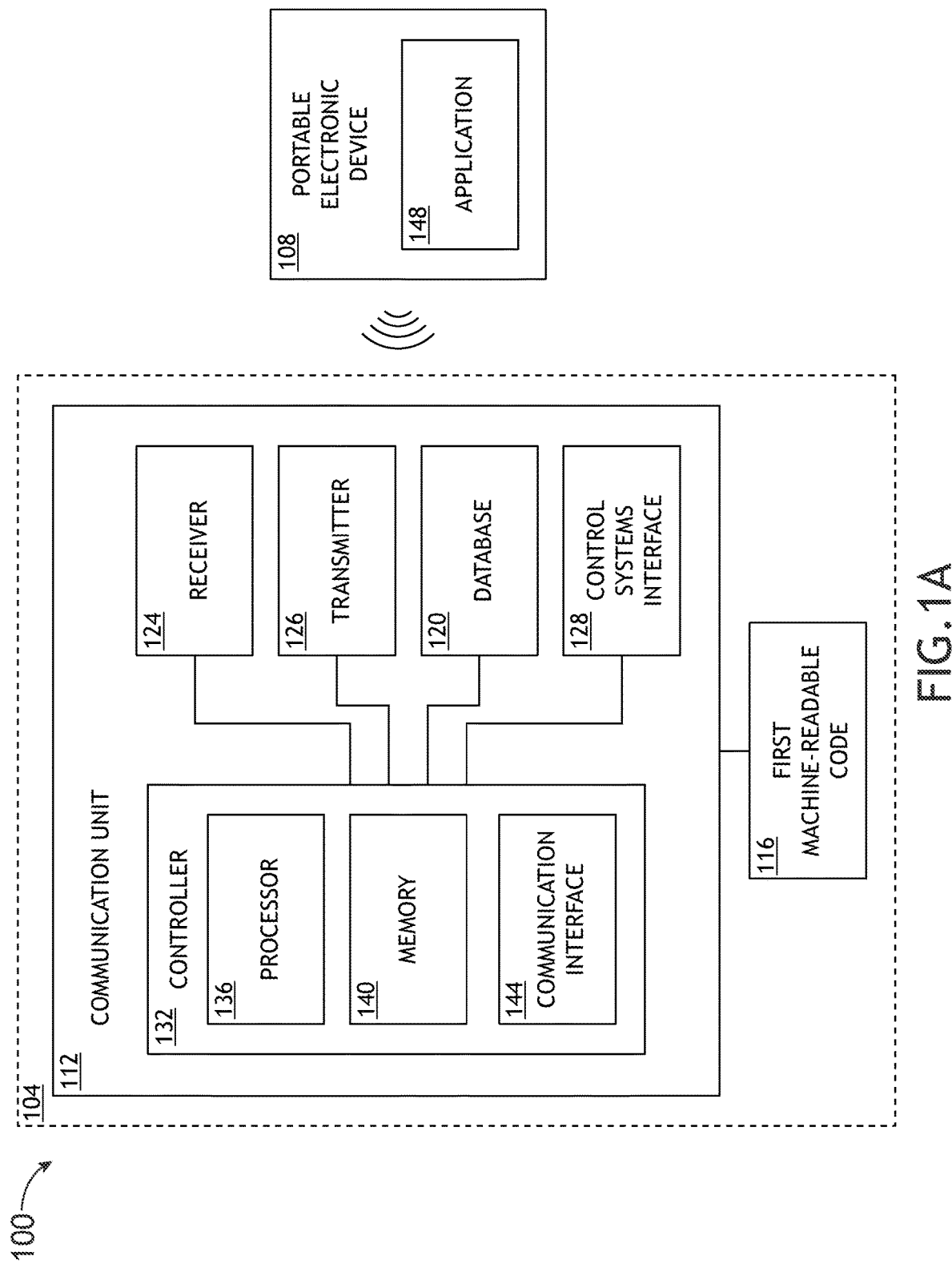
FIG. 1A is a block diagram illustrating a scheme of a system for controlling one or more control systems, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An aircraft smart cabin control system is disclosed that reduces the direct contact of passengers with various cabin control systems (e.g., entertainment systems, seat adjustment systems, or vending systems), creating a "touchless" system. Quick Response (QR) codes are placed on passenger seats, allowing passengers to scan the QR codes with their portable electronic devices (e.g., smartphones). Software installed on the smartphone reads the QR code and interacts with an aircraft communication unit to properly identify the passenger. Once identified and cleared for using the application, the passenger may then interact with and/or control the various cabin control systems via their smartphones. An overhead storage compartment is also disclosed that may be controlled (e.g., opened, closed, locked, or unlocked) through the aircraft smart cabin control system as well as via a gesture sensing system that can sense and recognize specific hand movements (e.g., a left-to-right swiping gesture) and control the overhead storage compartment based on the specific hand movements. The aircraft smart cabin control system reduces direct contact of the passenger (e.g., finger touches) with cabin control systems, which reduces the risk of transmission of communicable diseases via touching of contaminated surfaces.

FIG. 1A is a block diagram illustrating a scheme 100 of a system 104 for controlling one or more control systems, in accordance with one or more embodiments of the disclosure. The system 104 may be used under any circumstance where multiple people may be in direct contact with surfaces of one or more control systems including but not limited to aircraft cabins, bus interiors, train interiors, public restrooms, communal kitchen areas, theaters, and the like.

In some embodiments, the scheme includes the system 104 and a portable electronic device 108 configured to communicate with the system 104 via a communication unit 112. The communication unit 112 includes componentry required for communication with the portable electronic device 108. The portable electronic device 108 may include any type of communication device including but not limited a mobile phone (e.g., smartphone), tablet computer, laptop computer, phablet, wristwatch (e.g., smart watch), and the like. For example, the portable electronic device 108 may be configured as a smartphone that sends a first input message to the communication unit 112 to operate a control system, such as turning off a reading light.

In some embodiments, the system 104 further includes a first machine-readable code 116 configured to attach to a first surface (e.g., a surface of an aircraft cabin, a passenger seat, a public lavatory door, or a theater seat) and be scanned by the portable electronic device 108. The first machine-readable code 116 identifies one or more control systems that may be controlled by the portable electronic device 108. The first machine-readable code 116 may be configured as any type of scannable machine-readable code including but not limited to a Quick Response (QR) code, a barcode, data matrix codes, RFID codes, and smart labels. Data relating to the identification of the first machine-readable code 116, the status of the control system represented by the first machine-readable code 116, and the status of the portable electronic device 108 that has scanned the first machine-readable code 116 may be stored within a database 120 or other storage unit.

In some embodiments, the communication unit 112 further includes a receiver 124 and a transmitter 126 (e.g., a transceiver) configured to communicate with the portable electronic device 108. The communication unit 112 may utilize any type of wireless or wireline communication modality or waveform to communicate with the portable electronic device 108 including but not limited to Bluetooth, Bluetooth Low Energy, Wi-Fi, ZigBee, WiMAX, and 5G.

In some embodiments, the communication unit 112 further includes a control systems interface 128 configured to communicate with one or more control systems or control sub-systems (e.g., entertainment systems, seat adjustment systems, or lavatory system). The control systems interface 128 may utilize any type of wireless or wireline communication modality or waveform to communicate with the portable electronic device including but not limited to Bluetooth, Bluetooth Low Energy, Wi-Fi, ZigBee, WiMAX, and 5G.

In some embodiments, the communication unit further includes a controller 132. The controller 132 is configured to provide processing functionality for the communication unit 112. The controller 132 includes at least one processor 136 (e.g., micro-controllers, circuitry, integrated circuits, field programmable gate arrays (FPGA), or other processing systems), and resident or external memory 140 for storing data, executable code, instructions, and other information. The controller 132 can execute one or more software programs embodied in a non-transitory computer readable medium (e.g., memory 140) that implement techniques described herein (e.g., causing the controller to implement techniques described herein). The controller 132 is not limited by the materials from which it is formed or the processing mechanisms employed therein and, as such, can be implemented via semiconductor(s) and/or transistors (e.g., using electronic integrated circuit (IC) components), and so forth.

The memory 140 can be an example of tangible, computer-readable storage medium that provides storage functionality to store various data and/or program code associated with operation of the controller 132, such as software programs and/or code segments, or other data to instruct the controller 132, and possibly other components of the communication unit 112, to perform the functionality described herein. Thus, the memory 140 can store data, such as a program of instructions for operating the communication unit, including its components (e.g., controller 132), and so forth. It should be noted that while a single memory 140 is described, a wide variety of types and combinations of memory 140 (e.g., tangible, non-transitory memory) can be employed. The memory 140 can be integral with the controller 132, can comprise stand-alone memory, or can be a combination of both. Some examples of the memory 140 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The controller 132 further includes a communication interface 144. The communication interface 144 can be operatively configured to communicate with components of the communication unit 112, the system 104 and/or the scheme 100. For example, the communication interface 144 can be configured to retrieve data from the controller 132 or other components, transmit data for storage in the memory 140, retrieve data from storage in the memory 140, and so forth. The communication interface 144 can also be communicatively coupled with the controller 132 to facilitate data transfer between components of the communication unit 112, the system 104 and/or scheme. It should be noted that while the communication interface 144 is described as a component of the controller 132, one or more components of the communication interface 144 can be implemented as external components communicatively coupled to the controller 132 via a wired and/or wireless connection.

In embodiments, the system 104 includes an application 148 (e.g., a software application) installed on the portable electronic device 108 that is configured to command the portable electronic device 108 to implement one or more steps as described herein. For example, the application 148 may command the portable electronic device 108 to operate a camera on the portable electronic device 108 to scan the first machine-readable code 116 generating first scanned data. The application may be initially downloaded to the portable electronic device 108 from the database 120, from a website, or from other memory 140.

Figure 1B:
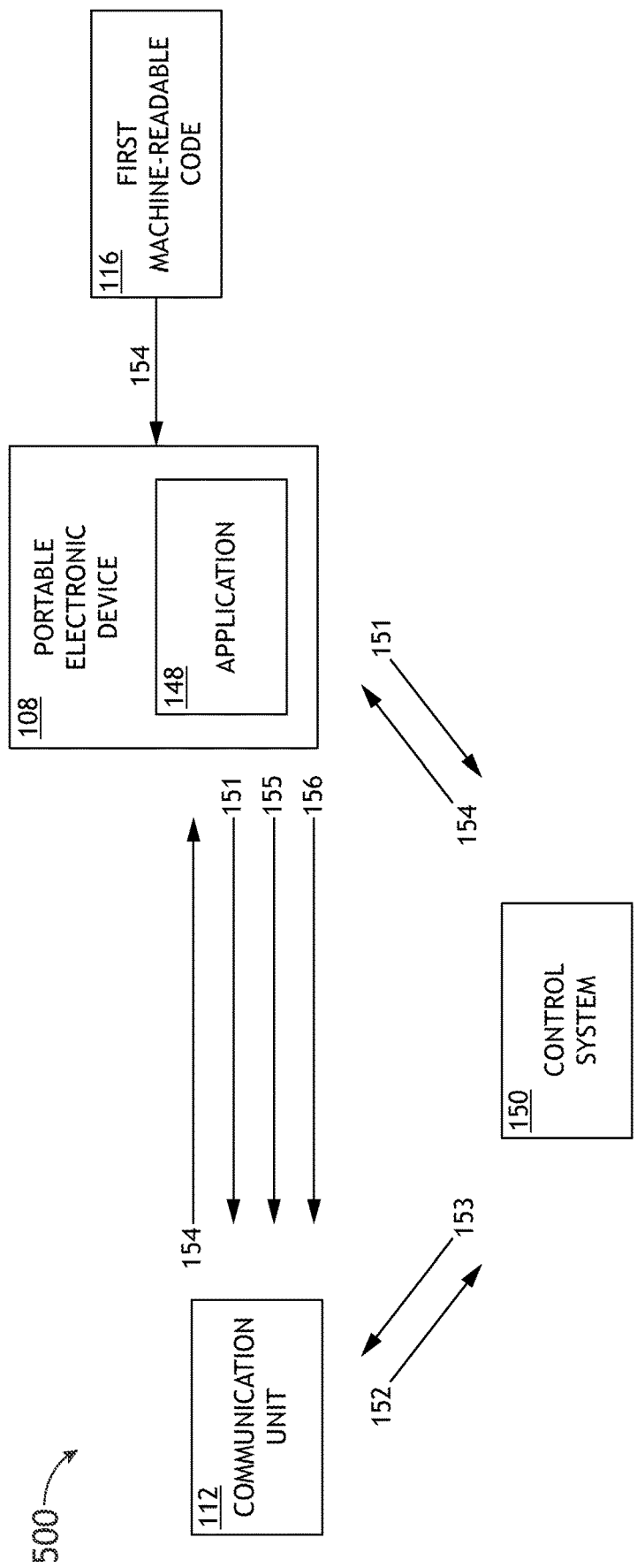
FIG. 1B is a block diagram illustrating communication between the communication unit, the portable electronic device, and the one or more control systems, in accordance with one or more embodiments of the disclosure.

FIG. 1B is a block diagram illustrating communication between the communication unit 112, the portable electronic device 108, and the one or more control systems 150, in accordance with one or more embodiments of the disclosure. As described herein, once the portable electronic device has scanned the first machine-readable code 116, the portable electronic device sends, via the application 148, the first input message 151 to the communication unit 112. The communication unit 112 then sends, via the controller 132, a control message 152 based on the information and/or instruction received from the first input message 151. The control system 150 then responds in accordance to the instruction provided by control message 151 (e.g., turning on a light). The control system 150 may then send a system response message 153 to the communication unit 112, which may then be relayed as a device response message 154 to the portable electronic device 108. In some embodiments, once communication has been established between the portable electronic device 108 and the control system 150, via the communication unit 112 the portable electronic device 108 and the control system 150 may communicate directly.

In some embodiments, the communication between portable electronic device 108 and the communication unit 112 requires the first scan data 155 identifying the targeted control system 150 as well as identification input 156. The identification input 156 incudes data that can determine the identification of the passenger and/or the portable electronic device 108. The identification input 156 may include data of any type and from any identification source including but not limited to ticket data (ticket number, airline account, identification numbers, etc.), personal data (e.g., name or social security numbers), images (e.g., QR codes, portraits), and the like. Once the identification input 156 and the first scan data 155 is received by the communication unit 112, the at least one processor 136 can execute the step of determining, based on the first scan data 155 and the identification input 156, a user identification, wherein the communication device associates the first machine-readable code as scanned by an identified portable electronic device 108. The communication unit 112 may further receive manifest data from the database 120 or other resources to ensure that the user identification is correct, that the portable electronic device is correctly attributed, and/or that the portable electronic device has the correct credentials or clearance to operate, control, or otherwise interact with the control system 150.

Figure 1C:
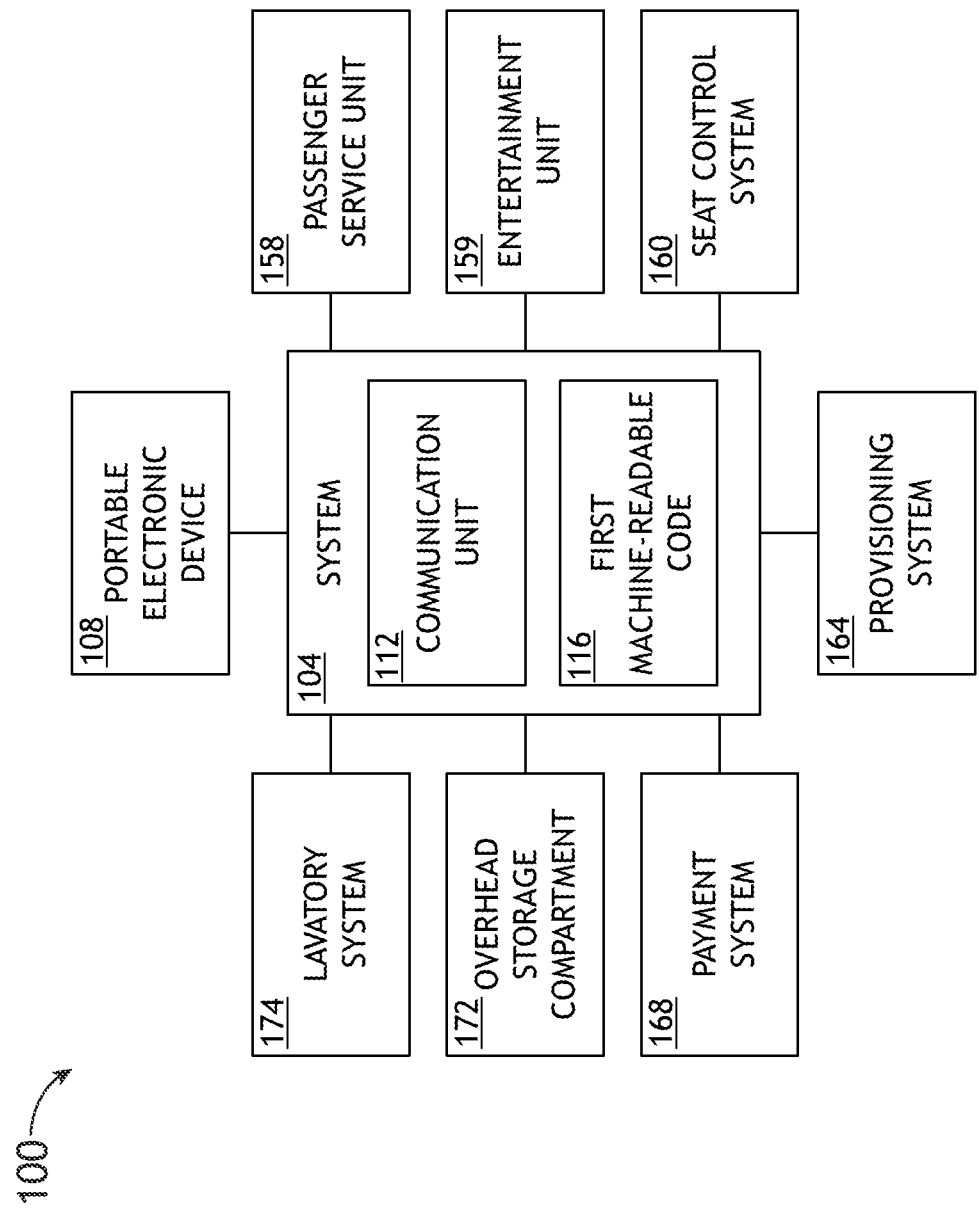
FIG. 1C is a block diagram illustrating the scheme including the one or more control systems, in accordance with one or more embodiments of the disclosure.

FIG. 1C is a block diagram illustrating the scheme 100 including the one or more control systems 150, in accordance with one or more embodiments of the disclosure. Each control system 150 may be communicatively coupled to the portable electronic device 108 as described herein. The scheme 100 may contain any type or any number of control systems 150 including but not limited to a passenger service unit 158, an entertainment system 159, a seat control system 160, a provisioning system 164, a payment system 168, an overhead storage compartment 172, and a lavatory system 176. The portable electronic device 108 may control any or all control systems via communication with the communication unit 112. For example, the portable electronic device 108 may send a first input message 151 to the communication unit 112, and a corresponding control message 152 may be sent to the respective control system 150 based on the instruction provides by the first input message.

The passenger service unit 158 may include one or more common passenger-interaction components situated above or beside each row or passenger seat within each row, typically incorporated into an overhead panel. The passenger service unit 158 includes but is not limited to a light (e.g., reading light), a gasper, and an/or attendant signal. For example, the first input message 151 (e.g., sent from the portable electronic device 108 to the communication unit 112, which is relayed to the passenger service unit 158), may be configured as an instruction to alter the brightness of the light. In another example, the first input message 151 may be configured as an instruction to change the airflow, airflow intensity, or airflow direction of the gasper. In another example, the first input message 151 may be configured as an instruction to activate the attendant light.

The entertainment system 159 may include any entertainment componentry including but not limited to speakers, displays, compact disc players, DVD players, video game consoles, and the like. For example, the portable electronic device 108 may be configured to control (e.g., start, pause, stop) a movie playing on a display embedded within a seatback via communication with the communication unit 112, and further communication between the communication unit 112 and the entertainment system 159 In another example, the portable electronic device 108 may be able to access a movie title on a movie database within the entertainment system 159, and instruct the entertainment system 159 to play the movie on the embedded display or the portable electronic device 108.

In some embodiments, the portable electronic device 108 may be configured to cast media back and forth from the portable electronic device 108 to the entertainment system 159 via the communication unit 112. For example, the portable electronic device 108 may be configured to cast a movie playing on the portable electronic device 108 to the embedded display via communication between the communication unit 112 and the entertainment system 159. In another example, the embedded display may be configured to cast a movie playing on the embedded display onto the portable electronic device 108.

The seat control system 160 may include any type of automated seat control including but not limited to a recline element, a swivel element, or a lock element. For example, the seat control system 160 may include a multiple seat adjustment scheme with seating memory that can store specific seating settings that can be activated or modified by communication with the portable electronic device 108 via the communication unit 112.

The provisioning system 164 may include any type of ordering system for food, drink, and other amenities. For example, the provisioning system 164 may include a food cart/trolley, where upon scanning of a first machine-readable code 116 by the portable electronic device 108 on either the cart/trolley or the passenger seat, an item on the cart/trolley may be ordered from a menu that is then displayed on the portable electronic device 108. In another example, the provisioning system 164 may be configured as a self-serve kiosk selling cans of soda, wherein a first machine-readable code 116 disposed on the kiosk may be scanned, and an dynamic order menu is then displayed on the portable electronic device 108.

The payment system 168 may include first machine-readable codes 116 specific for purchasing items. For example, the payment system 168 may include a first machine-readable code 116 placed on a food cart/trolley, wherein after being handed a food item, the portable electronic device 108 may scan the first machine-readable code 116, causing the application 148 to display on the portable electronic device 108 a payment screen for the food item, wherein the payment screen may be used to make a payment. In another example, the payment system 168 may include first machine-readable codes 116 printed on a menu, wherein upon scanning, a first machine-readable code for a specific menu item, the application would then display on the portable electronic device 108 a payment screen for the specific menu item. In some embodiments, the payment system 168 and the provisioning system 164 may be combined. The payment system 168 and/or provisioning system 164 may be configured for the sale of physical items (e.g., food) and/or virtual items (e.g., electronic in-flight magazines).

The lavatory system 174 may include first machine-readable codes 116 placed inside and/or outside of the lavatory, and may involve control of a lavatory door, a commode lid, a disinfection system, a call button; or a lavatory status indicator. For example, the lavatory system 174 may include a first machine-readable code 116 placed on the outside of the lavatory, wherein upon scanning by the portable electronic device 108, the application 148 may display on the portable electronic device 108 an icon that, when touched, would open the lavatory door. In another example, the lavatory system 174 may include a first machine-readable code 116 placed on the inside of the lavatory, where upon scanning, the application may display on the portable electronic device 108 an icon that, when touched, would open the commode lid. In another example, the lavatory system 174 may be linked to a first machine-readable code placed on the back of a seatback, wherein upon scanning by the portable electronic device 108, the portable electronic device 108 may display a screen with an icon that, when touched, would indicate the status of the lavatory status indicator (e.g., occupied or unoccupied). The disinfection system may include a system that upon activation releases a disinfection gas, liquid, spray, or mist into the lavatory. The disinfection system may also be configured as an alert that alerts staff of an unsanitary condition within the lavatory.

Figure 2A:
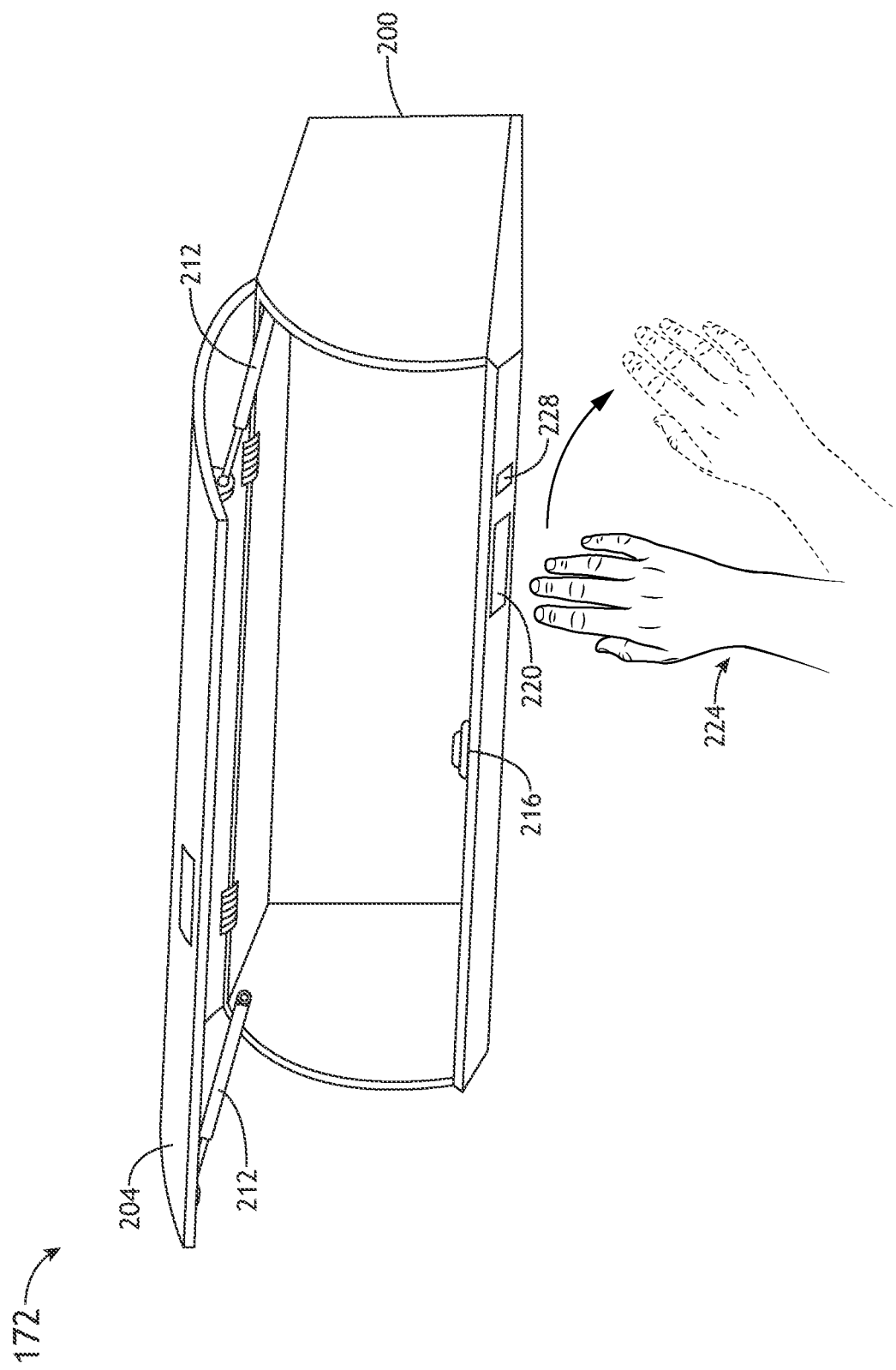
FIG. 2A is a drawing of an overhead storage compartment, in accordance with one or more embodiments of the disclosure.
Figure 2B:
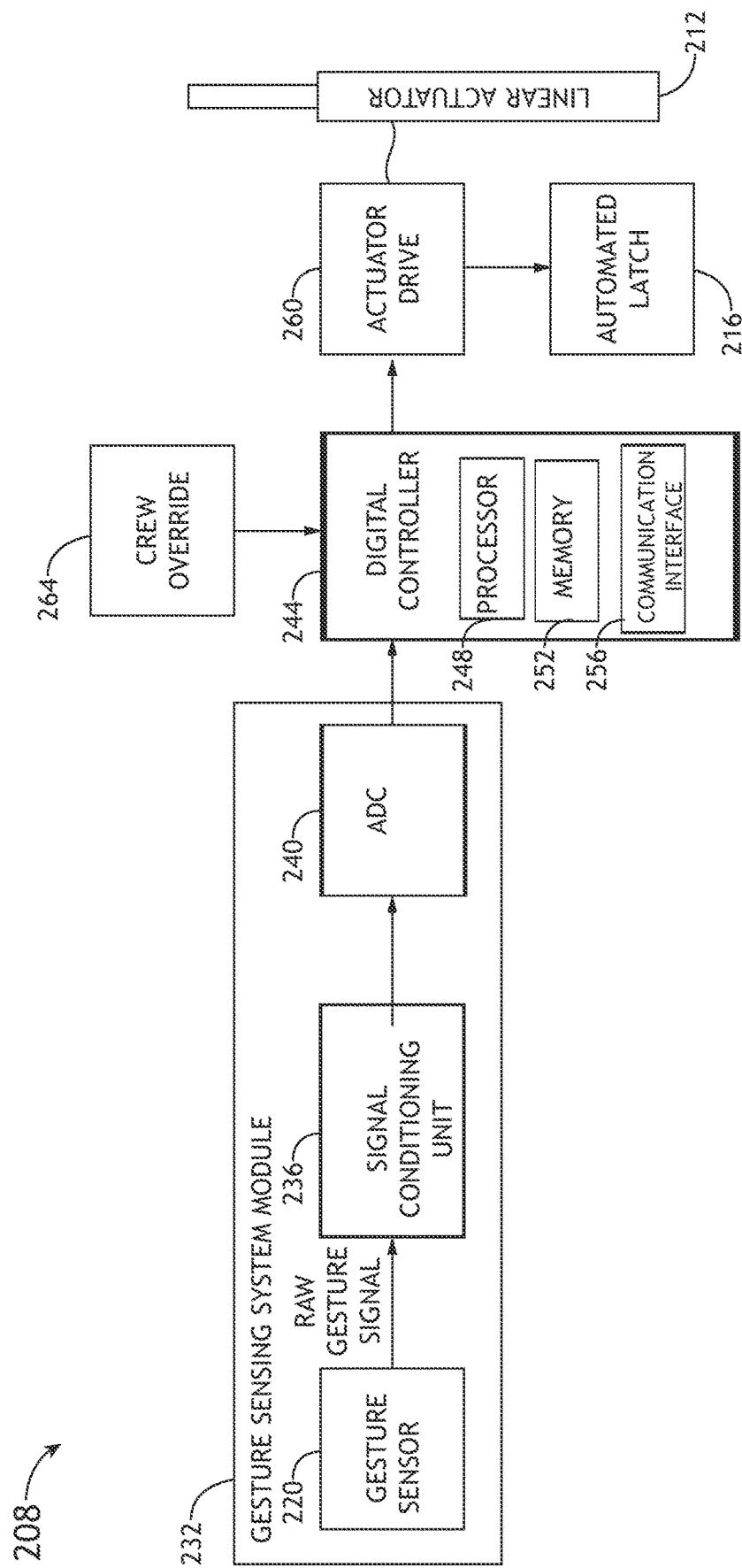
FIG. 2B is a block diagram of the overhead storage compartment, in accordance with one or more embodiments of the disclosure.

FIGS. 2A and 2B are illustrations of the overhead storage compartment 172, in accordance with one or more embodiments of the disclosure. The overhead storage compartment 172 includes a storage body 200 and a storage lid 204, The overhead storage compartment may also include and/or be associated with componentry within the scheme 100 and/or a gesture sensing system 208. For example, the overhead storage compartment 172 may communicatively couple to the scheme 100, the gesture sensing system 208, or both.

The overhead storage compartment 172 may include a linear actuator 212 configured to open and close the storage lid 204. The linear actuator 212 may be configured as any type of linear actuator and may be further configured as any commercially available actuator. The overhead storage compartment 172 may further include hydraulic dampeners that work in parallel with the linear actuator 212. The storage lid 204 may be further configured to be manually opened and closed upon failure of the linear actuators 212. The overhead storage compartment may also include an automated latch 216 configured to latch, unlatch, lock, or unlock upon receiving a prerequisite signal. The automated latch may be configured as any type of automated latch including but not limited to the E-latch system vended by Kiekert.

The overhead storage compartment 172 may further include a gesture sensor 220 configured to detect the movement of a hand 224 or other moving entity. The gesture sensor 220 may be configured as any type of sensor that can detect movement. For example, the gesture sensor 220 may be configured as an infrared proximity motion sensor. For instance, the gesture sensor 220 may be configured as one or more proximity sensors and two or more infrared light emitting diodes (LED), that, when reflected back to the infrared sensors via a moving object, may be interpreted as a specific movement or gesture by the gesture sensing system 208. The overhead storage compartment 172 may also contain an indicator light 228 indicating the status of the storage lid 204 (e.g., open, closed, locked, or unlocked).

Referring to FIG. 2B, the gesture sensing system 208 includes a gesture sensing system module 232 that includes the gesture sensor 220, which sends raw signals picked up by the gesture sensor 220 to a signal conditioning unit 236 configured to amplify and convert the raw signals to a form that facilitates analysis and/or conversion in downstream steps. The resultant modified signal is then converted from an analog to digital signal via an analog to digital converter (ADC) 240, and sent to a digital controller 244 configured to, via processors 248, memory 252, and a communication interface 256, perform the processing required to determine the presence of a gesture and to send signals based on that determination (e.g., the digital signal includes the gesture information about the object in front of the gesture sensor 220 and the digital controller 244 includes software to process the gesture information). For example, the digital controller 244 may send a signal to an actuator drive 260, that operates the linear actuator 212. In another example, the digital controller 244 may send a signal to the automated latch 216, causing the automated latch 216 to unlock. The digital controller 244 may also receive a crew override 264 configured as a signal from a crew member instructing the immediately open, close, lock, or unlock the storage lid 204.

The gesture to be detected may include any type of gesturing including but not limited to a left-to-right wave and a right-to-left wave.

Figure 3:
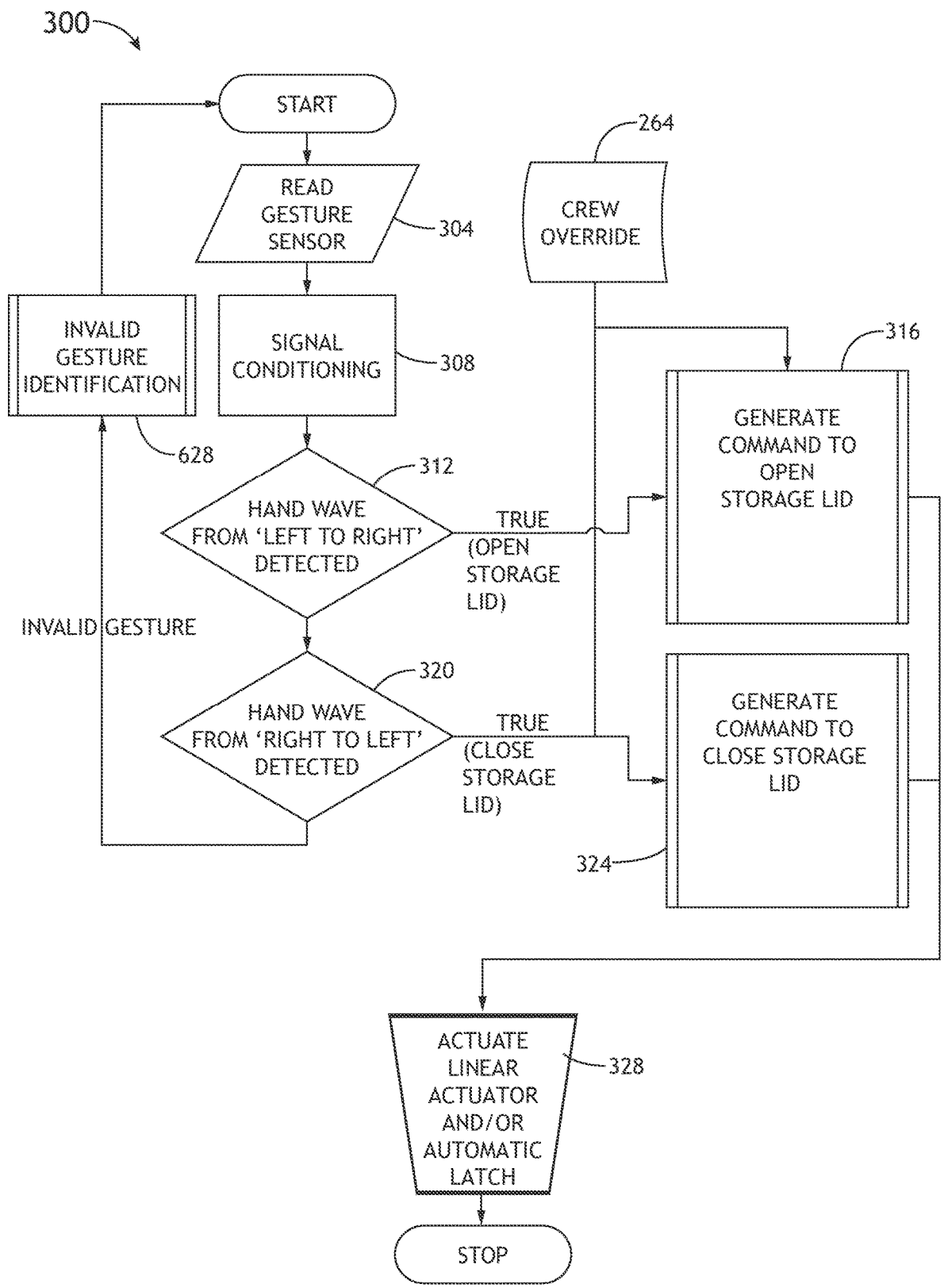
FIG. 3 is a flow chart illustrating a method for detecting a left-to-right hand wave or a right-to-left gesture by the gesture sensor, in accordance with one or more embodiments of the disclosure.

FIG. 3 is a flow chart illustrating a method 300 for detecting a left-to-right hand wave or a right-to-left gesture by the gesture sensor 220, in accordance with one or more embodiments of the disclosure. As previously mentioned, any type of gesture may be detected within the method 300 or other methods. In embodiments, the method 300 includes a step 304 of reading the gesture sensor 220. For example, after a gesture (e.g., left to right wave) has been detected, the gesture sensor 220 may send out a raw signal. In embodiments, the method includes the step of conditioning the raw signal 308 (e.g., via the signal conditioning unit 236. For example, the signal conditioning unit 236 may amplify the raw signal.

In some embodiments, the method 300 includes a step 312 of determining if a hand wave from left to right (e.g., for opening the storage lid 204) has been detected (e.g., as determined by the digital controller 244). For example, if the hand wave from left to right has been determined (e.g., true), the method 300 will then progress to a step 316 of generating the command to open the storage lid. In another example, if the left to right handwave has not been determined, the method 300 may include a step 320 of determining if the hand wave from right to left (e.g., for closing the storage lid 204) has been detected (e.g., as determined by the digital controller 244). For example, if the hand wave from right to left has been determined (e.g., true), the method 300 will then progress to a step 324 of generating the command to close the storage lid 204. The method may then progress to a step 328 of actuating the linear actuator 212 and/or the automatic latch as commanded by step 316 or step 324. At any time, a crew override 264 may be received. If a gesture is not identified as any gesture to be identified by the method 300 (e.g., an invalid gesture), the method 300 may start over and begine with the next gesture detected by the gesture sensor 220. Upon the determination by the gesture sensing system 208 of an invalid gesture, the gesture sensing system may 208 may give an alert, such as a series of flashes from the indicator light 228.

In some embodiments, the crew override 264 any result in any or all of the storage lids 212 to be actuated at the same time (e.g., some or all of the overhead storage compartments 172 may be communicatively coupled to each other and be actuatable). For instance, an attendant may utilize the crew override 264 to close and latch all storage lids 204 just before takeoff saving time. In another example, the attendant may utilize the crew override 264 to open all of the storage lids 208 for inspection purposes. In this manner, the attendant need only monitor, not touch any potentially contaminating surfaces.

Figure 4:
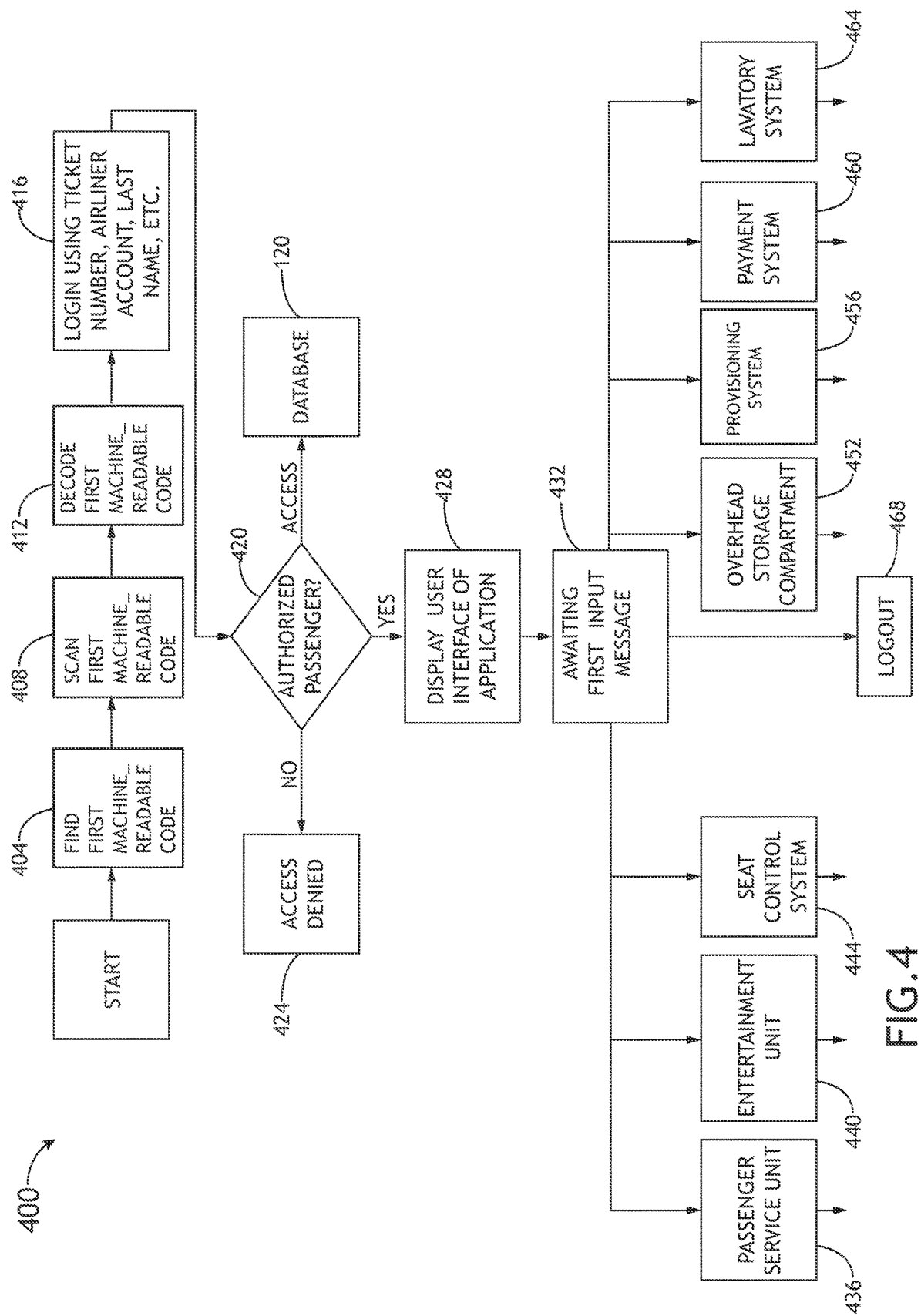
FIG. 4 is a flowchart illustrating a method for controlling control systems via a personal electronic device, in accordance with one or more embodiments of the disclosure.

FIG. 4 is a flowchart illustrating a method 400 for controlling control systems 150 via a personal electronic device 108, in accordance with one or more embodiments of the disclosure. In some embodiments, the method 400 includes a step 404 of finding the first machine-readable code 116. For example, the first machine-readable code 116 for a seated passenger may be located on the reverse side of a seatback directly in front of a passenger.

In some embodiments, the method 400 includes a step 408 of scanning the first machine-readable code 116. For example, the first machine-readable code 116 may be scanned by a portable electronic device 108 configured as a smartphone with an integrated camera configured to capture QR codes. The smartphone may use already integrated software or the application 148 to initially scan and capture the the first machine-readable code 116.

In some embodiments, the method includes a step 412 of decoding the first machine-readable code 116. For example, upon scanning the machine-machine readable code 116, a smartphone may be directed to a website, intranet link, or other site to download and install the application 148, wherein the installed application then decodes other aspects of the first machine-readable code 116. In another example, the smartphone may have already downloaded and installed the application before the scanning of the first machine-readable code 116, and uses the application 148 to decode the first machine-readable code 116.

In some embodiments, the method 400 includes a step 416 of logging in to the communication unit 112 using the identification input 156. For example, a passenger may log in to the communication unit 112 using a ticket number. In another example, a passenger may log into the communication unit 112 using their last name.

In some embodiments, the method 400 includes a step 420 of determining if the passenger (e.g., via the portable electronic device 108) is authorized to access the communication unit 112. For example, the communication unit 112, via the controller 132, may use received identification input 156 and first scan data 155, along with manifest data from the database 120 to determine a user identification. If the user is not identified (e.g., an incorrect or invalid portable electronic device 108 was used), the method 400 may progress to a step 424 of denying access to the portable electronic device 108.

Upon a successful step 420, the method 400 may include a step 428 of displaying options within the user interface of the application 148, and may further include a step 432 of awaiting a first input message 151. In particular, the user interface may display particular control systems 150 for which the portable electronic device 108 has access. The method 400 may then include one or more steps 436-460, such as step a 436 of sending a first input message 151 for accessing the passenger service unit 158, a step 440 of sending a first input message for accessing the entertainment system 159, a step 444 of sending a first input message for accessing the seat control system 160, a step 452 of sending a first input message for accessing the overhead storage compartment 172, a step 456 of sending a first input message for accessing the provisioning system 164, a step 460 of sending a first input message for accessing the payment system 168, and/or a step 464 of sending a first input message for accessing the lavatory system 174. The user may also choose a step 468 of logging out of the system 104.

In some embodiments, one or more control systems 150 may have different levels of accessibility and/or security depending on the nature of the control system. For example, the lavatory system 174 and/or the overhead storage compartment 172 may each be configured with common access accessibility with few or no restrictions for access. In another example, the passenger service unit 158 and the seat control system 160 be configured with moderately restrictive accessibility, as only the person using the passenger seat should have access to the specific passenger service units 158 and the specific seat control systems 160. In another example, the payment system 168 would be configured with a highly restrictive accessibility/security level.

Figure 5:
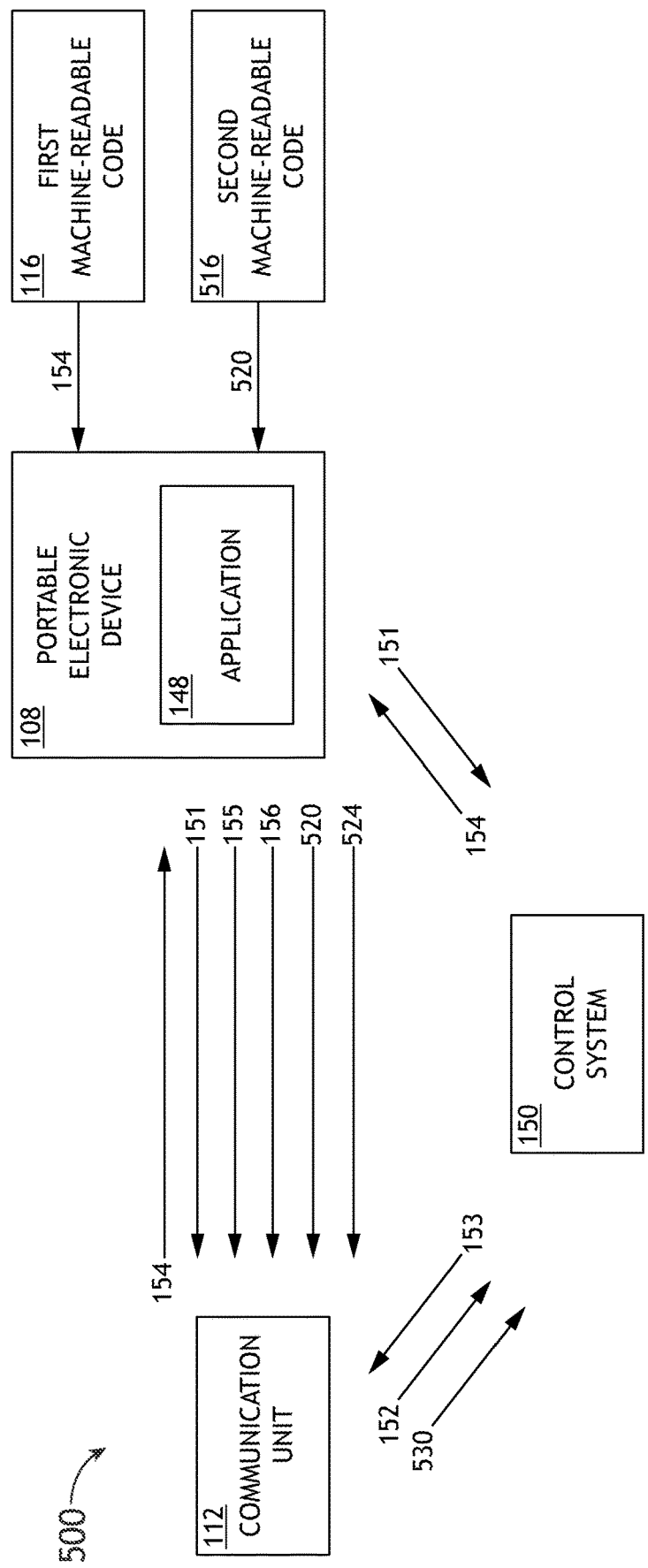
FIG. 5 is a block diagram illustrating a hierarchical scheme for controlling one or more control systems, in accordance with one or more embodiments of the disclosure.

FIG. 5 is a block diagram illustrating a hierarchical scheme 500 for controlling one or more control systems 150, in accordance with one or more embodiments of the disclosure. The scheme 500 may be configured to include one or more, or all, components of the scheme 100 and vice versa.

In some embodiments, the scheme 500 further includes a second machine-readable code 516 disposed on a second surface (e.g., of a cabin interior. Such as a, food cart/trolley) configured to be scanned by the portable electronic device 108 producing second scanned data 520. The second machine-readable code 516 may be further configured as any type of machine-readable code as described herein. The second machine-readable code 516 is further configured as a secondary code within a hierarchy of machine-readable codes within the scheme 500 (e.g., the first machine-readable code 116 further configured as a primary code within the hierarchy of machine-readable codes within the scheme 500). For example, the scheme 500 may be configured so that the scanning of the second-machine code 516 does not result in an action upon the one or more control sub-systems 522 unless the communication unit 112 has already generated a user identification based on first scanned data 155 and identification input 156 received from the first machine-readable code 116 and recognizes the portable electronic device 108. Once the portable electronic device 108 has been recognized, the communication unit 112 may then receive second scanned data 520 and a second input message 524 (e.g., a request to access and/or control a control sub-system 522). The communication unit 112 may then generate a sub-control message 530 based on the user identification and the second input message 524, and send the sub-control message 530 to the control sub-system 522.

Any control system 150, such as those described herein, may be configured as a sub-control system 522 within the scheme 500 including but not limited to the passenger service unit 158, the entertainment system 159, the seat control system 160, the provisioning system 164, the payment system 168, the overhead storage compartment 172, and or the lavatory system 175. For example, the passenger service unit 158 may be configured as a control system 150, with the portable electronic device 108 initiating communication with the communication unit 112 via the first machine-readable code 116 (e.g., located on or near the passenger seat). The payment system 164 may then be configured as a sub-control system 522 as the portable electronic device 108 scans the second machine-readable code 516 (e.g., located on the food cart/trolley), and sends second scanned data 520 and a second input message to the communication unit 112, which then sends a corresponding sub-control message 530 to the passenger service unit 158.

In some embodiments, the scheme 500 may include control system 150 configured as a code registration system. For example, the portable electronic device 108 may initiate communication with the communication unit 112 via scanning the first machine-readable code 116 (e.g., located on or near the passenger seat), generate a user identification via the based on first scanned data 155 and identification input 156, and access/register with the code registration system. Afterwards, one or more, or all, of the control sub-systems 522 may be accessed, as the portable electronic device 108 scans the second machine-readable code 516 (e.g., located on the food cart/trolley, lavatory door, or other place), and sends second scanned data 520 and a second input message to the communication unit 112, which then sends a corresponding sub-control message 530 to the corresponding control sub-system 522. By configuring the control system 150 as a code registration system, the portable electronic device 108 may scan and access control sub-systems quickly without need for entering passwords or other identification.

Figure 6:
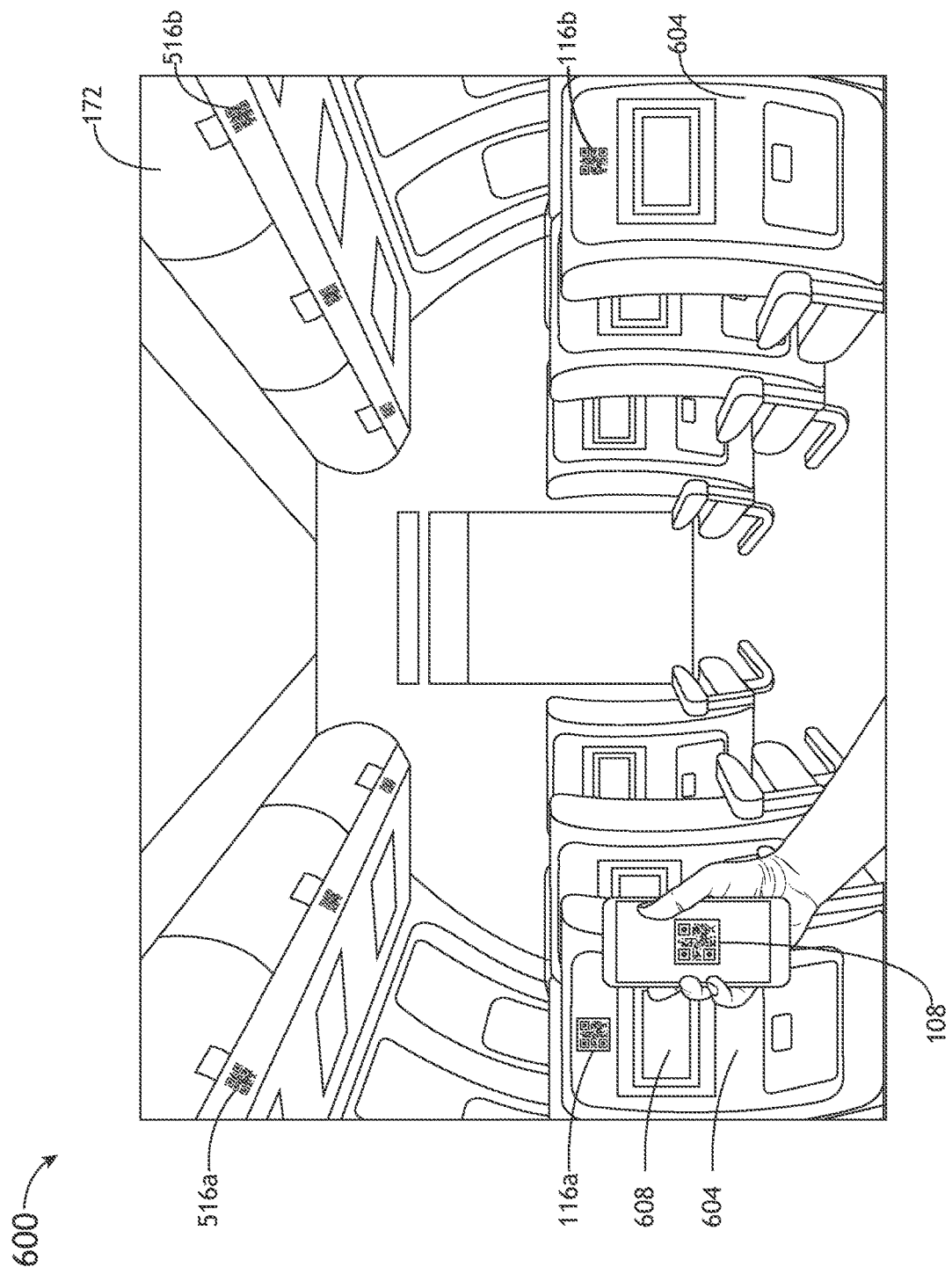
FIG. 6 is a drawing illustrating an aircraft cabin 600 configured with the scheme, in accordance with one or more embodiments of the disclosure.

FIG. 6 is a drawing illustrating an aircraft cabin 600 configured with the scheme 100, 500, in accordance with one or more embodiments of the disclosure. The aircraft cabin 600 includes one or more passenger seats 604 and the one or more overhead storage compartments 172. The one or more passenger seats may also include an embedded display 608. The aircraft cabin 600 may further include one or more first machine-readable codes 116a, 116b that may be scanned by the portable electronic device 108. The aircraft cabin 600 may further include one or more second machine-readable codes 516a, 516b that may be scanned by the portable electronic device 108, after the first machine-readable code 116 has been scanned.

Figure 7:
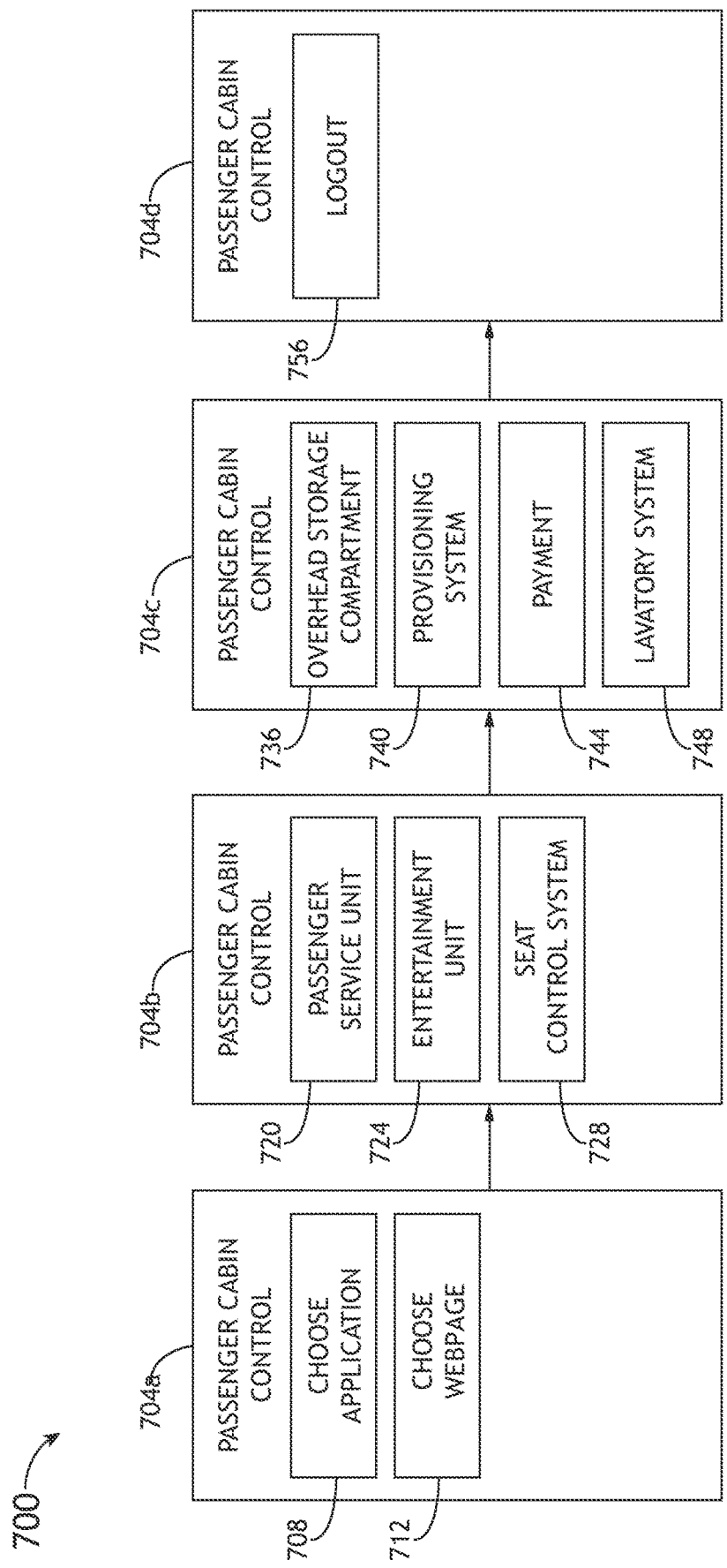
FIG. 7 is a block diagram illustrating an application interface displayed on the portable electronic device, in accordance with one or more embodiments of the disclosure.

FIG. 7 is a block diagram illustrating an application interface 700 displayed on the portable electronic device 108, in accordance with one or more embodiments of the disclosure. The application interface 700 is controlled by the application 148. The application interface 700 may include one or more pages 704a-70b (e.g., entitled "Passenger Cabin Control") that display clickable/pressable icons that lead to sub-pages. For example, page 704a may include a "Choose Application" icon 708 and a "Choose Webpage" icon 712 configured to lead the user to other pages 704b-d, or the internet, respectively. In another example, page 704b may include icons 720-728 representing options for entering sub-pages related to the passenger service unit 158, the entertainment system, 159, the seat control system 160, respectively. In another example, page 704c may include icons 736-748 representing options for entering sub-pages relating to the overhead storage compartment 172, the provisioning system 164, the payment system 168, and the lavatory system 174, respectively. In another example, page 704b may include a logout icon 756.

The application 148 controls and/or assists in several aspects of the system 104 via the portable electronic device 108. For example, the application may be configured to implement a step of receiving first scanned data 155 (e.g., from a camera integrated into the portable electronic device). The application may also be configured to implement a step of receiving an identification input 156. For example, a password may be entered into the application interface 700 of the application 148. In another example, the application 148 may be configured to implement a step of preparing and/or sending the first scanned data 155 to the communication unit 112 via the portable electronic device 108. In another example, the application 148 may be configured to implement a step of sending the first input message to at least one of the communication unit 112 or the one or more control systems 150.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
a first machine-readable code disposed on a first surface of an aircraft cabin, wherein the first machine-readable code is scanned by a portable electronic device, generating first scanned data;
a communication unit in communication with the portable electronic device comprising:
  a receiver;
  a transmitter;
  at least one processor; and
  a memory coupled to the at least one processor, the memory including instructions stored thereon, when executed by the at least one processor, causes the at least one processor to:
    receive the first scanned data from the portable electronic device;
    receive an identification input from the portable electronic device;
    determine, based on the first scanned data and the identification input, a user identification;
    receive a first input message from the portable electronic device; and
    send a control message to one or more control systems based on the user identification and the first input message; and
an application installed on the portable electronic device, wherein the application is configured with commands for implementing steps of:
  receiving the first scanned data;
  receiving the identification input;
  sending the first scanned data and the identification input to the communication unit; and
  sending the first input message to the communication unit or to one of the one or more control systems, wherein one of the one or more control systems is configured as a passenger service unit comprising an attendant signal, wherein the first input message is configured as an instruction to the passenger service unit to adjust an attendant signal status; and
one or more second machine-readable codes disposed on one or more second surfaces of the aircraft cabin, wherein the second machine-readable code is scanned by the portable electronic device, generating second scanned data, wherein the at least one processor is further instructed to:
  receive the second scanned data from the portable electronic device;
  receive a second input message from the portable electronic device; and
  send a sub-control message to one or more sub-control systems based on the user identification and the second input message, wherein the one or more sub-control systems is configured as a lavatory system, wherein one of the one or more second machine-readable codes is placed inside a lavatory, wherein the second input message associated with the second machine-readable code placed inside the lavatory is configured as an instruction to the lavatory system to at least one of open a commode lid or release a disinfectant.

2. The system of claim 1, wherein one of the one or more control systems is configured as an entertainment system, wherein the first input message is configured as an instruction to the entertainment system to send media to the portable electronic device.

3. The system of claim 2, wherein the entertainment system further comprises a display, wherein the first input message is configured as the instruction to the entertainment system, wherein the instruction includes at least one of:
  displaying the media on the display;
  casting the media from the display to the portable electronic device; or
  casting the media to the display from the portable electronic device.

4. The system of claim 1, wherein one of the one or more control systems is configured as a seat control unit comprising at least one of a recline element, a swivel element, or a lock element, wherein the first input message is configured as an instruction to the seat control unit to adjust at least one of the recline element, the swivel element, or the lock element.

5. The system of claim 1, wherein the one or more control systems is configured as a provisioning system, wherein the first input message is configured as an instruction to the provisioning system to order a provision vended by the provisioning system or to make a payment.

6. The system of claim 1, wherein one of the one or more control systems is configured as an overhead storage compartment comprising:
  a storage body; and
  a storage lid, wherein the first input message is configured as an instruction to the overhead storage compartment to at least one of open the storage lid or close the storage lid.

7. The system of claim 6, wherein the overhead storage compartment further includes:
  a linear actuator configured to open and close the storage lid;
  an automated latch configured to lock and unlock the storage lid;
  a digital controller communicatively coupled to the linear actuator and the automated latch, configured to control at least one of the linear actuator or the automated latch upon receiving the control message from the communication unit, the first input message from the portable electronic device, or a gesture signal from a gesture sensing system; and
  the gesture sensing system configured to generate the gesture signal, comprising:
    a gesture sensor configured to detect a gesture instruction;
    a signal conditioning unit; and
    an analog to digital converter.

8. The system of claim 1, wherein one of the one or more sub-control systems is configured as an overhead storage compartment comprising a storage lid, wherein the second input message is configured as an instruction to the overhead storage compartment to at least one of open the storage lid of or close the storage lid.

9. The system of claim 1, wherein one of the one or more sub-control systems is configured as a provisioning system, wherein the second input message is configured as an instruction to the provisioning system to at least one of order a provision vended by the provisioning system or make a payment.

10. The system of claim 1, wherein the instruction to the lavatory system comprises opening the commode lid.

11. The system of claim 1, wherein the instruction to the lavatory system comprises releasing a disinfectant.

12. The system of claim 1, wherein one of the one or more control systems is configured as an entertainment system, wherein one of the first input messages is configured as an instruction to the entertainment system to send media to the portable electronic device, wherein one of the one or more control systems is configured as a seat control unit comprising at least one of a recline element, a swivel element, or a lock element, wherein one of the first input messages is configured as an instruction to the seat control unit to adjust at least one of the recline element, the swivel element, or the lock element, wherein one of the one or more control systems is configured as an overhead storage compartment comprising:
  a storage body; and
  a storage lid, wherein one of the first input messages is configured as an instruction to the overhead storage compartment to at least one of open the storage lid or close the storage lid.

* * * * *